(12) United States Patent
Pochodyla (10) Patent No.: US 7,571,743 B2
(45) Date of Patent: Aug. 11, 2009

(54) GRAVITY FLOW ISOLATION DEVICE

(75) Inventor: Charles Pochodyla, St Marys (AU)

(73) Assignee: Sydney Water Corporation, Sydney (AU)

( * ) Notice: Subject to any disclaimer, the term of this patent is extended or adjusted under 35 U.S.C. 154(b) by 0 days.

(21) Appl. No.: 11/666,667

(22) PCT Filed: Nov. 8, 2005

(86) PCT No.: PCT/AU2005/001703

§ 371 (c)(1),
(2), (4) Date: Aug. 29, 2007

(87) PCT Pub. No.: WO2006/047835

PCT Pub. Date: May 11, 2006

(65) Prior Publication Data

US 2008/0115851 A1 May 22, 2008

(30) Foreign Application Priority Data

Nov. 8, 2004 (AU) .............................. 2004906412

(51) Int. Cl.
*F16L 55/12* (2006.01)
*G01H 3/04* (2006.01)
(52) U.S. Cl. ............................. 138/89; 138/90; 138/94; 251/299
(58) Field of Classification Search ............. 138/97, 138/94.5, 94, 137, 140, 141, DIG. 1; 251/294, 251/299; 405/39, 37; 428/36.91
See application file for complete search history.

(56) References Cited

U.S. PATENT DOCUMENTS

| | | | | |
|---|---|---|---|---|
| 2,942,839 A | * | 6/1960 | Smith | 251/144 |
| 3,315,585 A | * | 4/1967 | Hawkins et al. | 454/292 |
| 3,821,969 A | * | 7/1974 | Sinko | 138/89 |
| 3,927,860 A | * | 12/1975 | Smith et al. | 251/299 |
| 3,951,168 A | * | 4/1976 | Roberts | 137/625.28 |
| 4,103,495 A | * | 8/1978 | Graham | 405/40 |
| 4,602,504 A | * | 7/1986 | Barber | 73/49.8 |
| 4,621,945 A | * | 11/1986 | Schafer et al. | 405/39 |
| 4,706,482 A | * | 11/1987 | Barber | 73/49.8 |
| 4,889,166 A | * | 12/1989 | Lakatos | 137/813 |
| 5,020,567 A | * | 6/1991 | Proulx | 137/315.41 |
| 5,033,510 A | * | 7/1991 | Huber | 138/90 |
| 5,163,480 A | * | 11/1992 | Huber | 138/94 |
| 6,032,515 A | * | 3/2000 | Huber | 73/49.1 |
| 6,209,584 B1 | * | 4/2001 | Huber | 138/89 |

\* cited by examiner

*Primary Examiner*—Patrick F Brinson
(74) *Attorney, Agent, or Firm*—The Nath Law Group; Stanley N. Protigal; Sungyeop Chung (57) ABSTRACT

A device for isolating at least a portion of a pipe from fluid flowing therethrough. The device having a body (1) that is at least partially insertable into the pipe. An external surface of the body is adapted to abut with an inner surface of the pipe to substantially prevent fluid flowing therethrough. At least one valve element (10) is arranged within the body (1) and is selectively openable and closable to permit fluid to flow through the body to facilitate removal of the body from the pipe.

15 Claims, 9 Drawing Sheets

GRAVITY FLOW ISOLATION DEVICE

CROSS-REFERENCE TO RELATED APPLICATIONS

The present application claims priority from Provisional Patent Application No. 2004906412 filed on 8 Nov. 2004, the contents of which is incorporated herein by reference.

FIELD OF THE INVENTION

This invention relates to an isolation device. In particular, this invention relates to an isolation device in the form of a plug for sealing against the interior surface of a pipe in a gravity flow system, for example in a sewer system.

BACKGROUND OF THE INVENTION

Gravity flow systems, such as sewer systems, regularly require maintenance or repair and it is well known to block, or isolate, a sewer pipe from fluid flowing therethrough, to allow the necessary work to be carried out downstream from the blockage. The plugs in common usage for creating the necessary blockage are expandable or inflatable plugs, an example of which is the Muni Ball® manufactured by Cherne Industries, Inc. of Minnesota U.S.A. This inflatable plug includes an inflatable central portion capped at each end by steel plates. The central portion is inflated using pneumatic pressure to grip the interior surface of the pipe, thereby preventing fluid flow therethrough.

There are considerable problems associated with such inflatable plugs. Firstly, there are problems associated with the under-pressure of the plug i.e. when insufficient pneumatic pressure is supplied, for example in the event of failure of the pneumatic pump. In this case, the sealing grip of the inflatable portion against the interior surface of the pipe will be lost leading initially to undesirable leaks and then ultimately to the potentially high speed projection of the plug within the pipe as a result of water pressure which may have built up behind the plug. The projectile plug can then travel, with considerable force and energy, towards the workers in the downstream section of the pipe, which is obviously highly undesirable. To avoid such problems, it is intended that an inflatable plug is used in conjunction with a restraint but such restraints may be readily omitted by a user. Secondly, there are problems associated with over-pressurisation of the plug. If too much pressure is applied by the pneumatic pump, the inflatable portion may over-inflate to such an extent that it can burst, or otherwise fail. This will lead to a flood of water towards any workers present down-stream of the plug, together with high-speed projection of the remains of the plug, as a result of both the build-up of water pressure and the bursting action of the plug. Several workers have lost their lives as a result of an inflatable plug bursting or failing in such a manner.

In attempt to protect workers in such conditions, it is recommended that an exclusion area is created around the plug. It is also recommended that the pressure supplied to the plug be continuously monitored to ensure that under- or over-pressure does not occur. Adhering to both of these recommendations can be inconvenient for workers, particularly when space requirements are at a premium to make exclusion areas difficult to maintain and when personnel is limited to allow for constant monitoring of pressure supply levels.

Finally, the requirement for the provision of a compressor to provide compressed air to inflate the plug can be inconvenient as it is necessary to transport the compressor to the location of an access shaft of the gravity flow system and access shafts may be located in rough or steep terrain.

The present invention is directed towards providing a device for isolating a pipe, or sections of a pipe, which substantially ameliorates the problems associated with the known inflatable plugs.

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY OF THE INVENTION

In a first aspect, the present invention provides a plug comprising a rigid body having a base plate, the rigid body being at least partially encased in a sleeve, the sleeve being deformable and having an abutment surface for abutment against the interior surface of a gravity flow system pipe.

Preferably, the plug is frusto-conical in shape. This allows for accommodation of slight variations in pipe diameter. The abutment between the abutment surface on the sleeve and the interior surface of the pipe will occur towards the larger diameter end of the frusto-conical plug in larger diameter pipes and, preferably, towards the middle of the plug in smaller diameter pipes.

In preferred embodiments, the rigid body is formed of stainless steel, aluminium, composite carbon or plastic. The material must be sufficiently rigid so as not to deform when inserted into the gravity flow system pipe. Materials which are lighter in weight; such as aluminium, composite carbon and/or plastic may be most desirable to facilitate transportation of the plug between locations.

The sleeve preferably comprises at least one deformable layer which is preferably formed of an elastically deformable polymer. For example, the deformable layer(s) may be formed of vulcanised rubber, for example with a hardness of 30 Dura. Alternatively, the layer(s) may be made of neoprene closed cell rubber foam or Linatex 800®. The deformable layer(s) must be capable of deforming when inserted into the pipe of the gravity flow system. Often, the interior surface of such a pipe is irregular owing to deterioration caused by wear or as a result of the manufacturing process and the deformable layer(s) must be deformable to conform with the irregular interior surface of the pipe.

Preferably, the innermost deformable layer is attached to the rigid body using adhesive but any known form of bonding (e.g. chemical or heat bonding) can be used. The bonding between the deformable layer and the rigid body must be sufficient so that water pressure cannot shear the deformable layer from the rigid body.

In preferred embodiments, the sleeve further comprises an abrasion resistant layer, the abrasion resistant layer being outermost to form the abutment surface. As mentioned previously, the interior surface of a gravity flow system pipe is often irregular as a result of wear. The surface will be abrasive and providing an abrasion resistant layer allows protection of the deformable layer which may not be so resistant to abrasion. In especially preferred embodiments, the abrasion resistant layer is Linatex 800®.

In an especially preferred embodiment, the sleeve comprises a deformable layer formed of neoprene closed cell rubber foam and an abrasion resistant layer formed of Linatex 800®.

Preferably, the abrasion resistant layer is attached to the deformable layer using adhesive but any known form of bonding (e.g. chemical or heat bonding) can be used. The bonding between the layers must be sufficient so that water pressure cannot shear the abrasion resistant layer from the deformable layer(s).

In preferred embodiments, the plug includes one or more through channels terminating at one end at one or more apertures on the base plate. In most preferred embodiments, the through channels may be defined by the interior walls of the hollow rigid body. The apertures are selectively openable and closable using one or more valves. In use, this through-channel and apertures allow flow of waste water through the plug when the one or more valves are open.

After insertion of the plug into the gravity flow system pipe via the access shaft, the flow of waste water will be blocked and will build up behind the plug in the access shaft. After work downstream is completed, it is necessary to remove the plug from the gravity flow system via the access shaft. The water pressure of the waste water in the access shaft will impede removal of the plug. To reduce this problem, after completion of the downstream work, the valve can be opened so that waste water which has built up behind the plug can be drained through the plug to reduce the water pressure impeding removal of the plug.

In preferred embodiments, the valve comprises a sealing plate connected to the base plate at a hinge. The sealing plate may include a sealing layer for improving the seal between the sealing plate and aperture. The sealing layer is preferably a deformable material such as Linatex 800®, or a closed cell foam material.

To further assist sealing, the base plate may be provided with a raised flange defining the aperture. In preferred embodiments, the sealing plate seals against the rim of the flange.

The valve may alternatively be a slide valve, a butterfly valve or any other valve which can selectively open and close the aperture.

Preferably, the valve ca be actuated from outside the access shaft and the valve is preferably provided with means to allow external actuation. For example, the hinged sealing plate may include an eyelet to which a rope or rod may be attached to allow lifting of the plate to reveal the aperture.

Preferably, the valve includes means for maintaining the valve in an open position. For example, the eyelet on the hinged sealing plate may be secured to another part of the valve to hold the sealing plate away from the aperture.

In preferred embodiments, the plug includes means to prevent slipping of the plug within the pipe. The water pressure caused by the build up of water in the access shaft may cause slipping of the plug; slipping could occur at the top or bottom edge of the plug. Such slipping results in the plug sitting asymmetrically within the pipe, with the base plate moving from a vertical position to an inclined position. Whilst this may not result in leakage, it may make the plug more difficult to remove from the pipe after the downstream work is completed. Accordingly, the base plate is preferably provided with means to prevent inclination of the base plate from the vertical when positioned in a gravity flow system pipe. These means may act by abutment either directly or indirectly with the floor and/or wall of the access shaft.

Use of the term "floor of the access shaft" may refer to any lower surface of the access shaft. For example, the lower support bracket may abut directly or indirectly against the bottom surface of a flow channel formed at the base of the access shaft.

In preferred embodiments, the base plate is preferably provided with a lower support bracket for preventing slipping of the lower edge of the plug and/or an upper support bracket for preventing slipping of the upper edge of the plug. Most preferred embodiments have both an upper and lower support bracket.

In preferred embodiments, the lower support bracket extends substantially perpendicularly from the base plate and, in use, indirectly abuts the floor of the access shaft.

In preferred embodiments, the upper support bracket extends from the base plate and is cranked such that, in use, the upper portion of the upper support bracket extend up the access shaft so that the upper support bracket can indirectly abut the wall of the access shaft.

The term "indirectly abut(s)" is used to mean that the upper support bracket is connectable to an upper abutment means which abuts the wall of the access shaft when the plug is positioned in the gravity flow system pipe and the lower support bracket is connectable to a lower abutment means which abuts the floor of the access shaft when the plug is positioned in the gravity flow system pipe. The or each abutment means is preferably adjustable in length to accommodate various access shaft depths/widths.

The support brackets may each have a through-hole and a threaded nut and a threaded screw may be used as the upper and/or lower abutment means, the length of screw passing through the respective support bracket being adjustable to accommodate different depths/widths of access shaft.

In preferred embodiments, the upper abutment means is elongated and includes guide means at the end remote from the access shaft wall. The purpose of the guide means is to maintain the rope used to actuate the valve in the optimum position for valve actuation. For example, the guide means may be an eyelet through which the rope passes. The extent of elongation of the upper abutment means is such that the angle formed between the sealing plate and the rope assist lifting of the sealing plate. The most preferred angle is 45 degrees (measured when the rope is taut but not yet acting on the sealing plate) but variation from this angle is possible.

The upper support bracket preferably includes locking means to which the means for maintaining the valve in an open position can be locked. For example, the upper support bracket may include an eyelet which can be aligned with the eyelet on the hinged sealing plate. The eyelets can be maintained in an aligned position, for example by a bolt or karabiner.

In preferred embodiments, the plug includes means for assisting extraction of the plug from the interior of the gravity flow system pipe via the access shaft. In preferred embodiments, the plug is provided with at least one eyelet to which a rope or rod may be attached to pull the plug from the pipe. The eyelet(s) may be connected to the base plate and/or, the upper support plate, and/or the upper abutment means and/or the lower support plate.

In a second aspect, the present invention provides a method of sealing a gravity flow system pipe by inserting into said pipe a plug according to the first aspect of the invention.

In a third aspect, the present invention provides a method of sealing a gravity flow system pipe by inserting into said pipe a plug comprising a rigid body having a base plate, the rigid body being at least partially encased in a sleeve, the sleeve being deformable and having an abutment surface, such that, upon insertion, the sleeve is deformed and the abutment surface forms a sealing engagement with the interior surface of the gravity flow system pipe.

In a fourth aspect, the present invention is a device for isolating at least a portion of a pipe from fluid flowing therethrough, said device comprising: a body at least partially insertable into said pipe and having an external surface adapted to abut with an inner surface of the pipe to substantially prevent fluid flowing therethrough; and at least one valve element arranged within said body, said at least one valve element being selectively openable and closable to permit said fluid to flow through said body to facilitate removal of said body from said pipe.

In one embodiment of this aspect of the invention, the body is frusto-conical in shape. The body may be formed of stainless steel, aluminium, composite carbon or plastic. The external surface of the body may be a sleeve that at least partially encases the body. The sleeve may be deformable, and in one form, the sleeve may comprise at least one deformable layer formed of an elastically deformable polymer. The at least one deformable layer may be formed of vulcanised rubber, neoprene closed cell rubber foam or Linatex 800®.

In another form, the sleeve may further comprise an abrasion resistant layer, the abrasion resistant layer being outermost to form the external surface. The abrasion resistant layer may be Linatex 800®.

In another embodiment, the body may include a through channel terminating at one end at one or more apertures formed on a base plate. The base plate may be attached to an end of the body, such that each aperture may be selectively openable and closable using the valve element. The valve element may comprise a sealing plate connected to the base plate at a hinge. The sealing plate may include a sealing layer for improving the seal between the sealing plate and the aperture. The sealing layer may be Linatex 800® or a closed cell foam.

In another embodiment, the valve element is provided with means to allow remote actuation of the valve from outside the gravity flow system. In this regard, the valve element may be a butterfly valve or sliding valve.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF THE DRAWINGS

A preferred embodiment of the present invention will now be described with reference to the accompanying Figures in which.

DETAILED DESCRIPTION OF THE DRAWINGS

Figure 1:
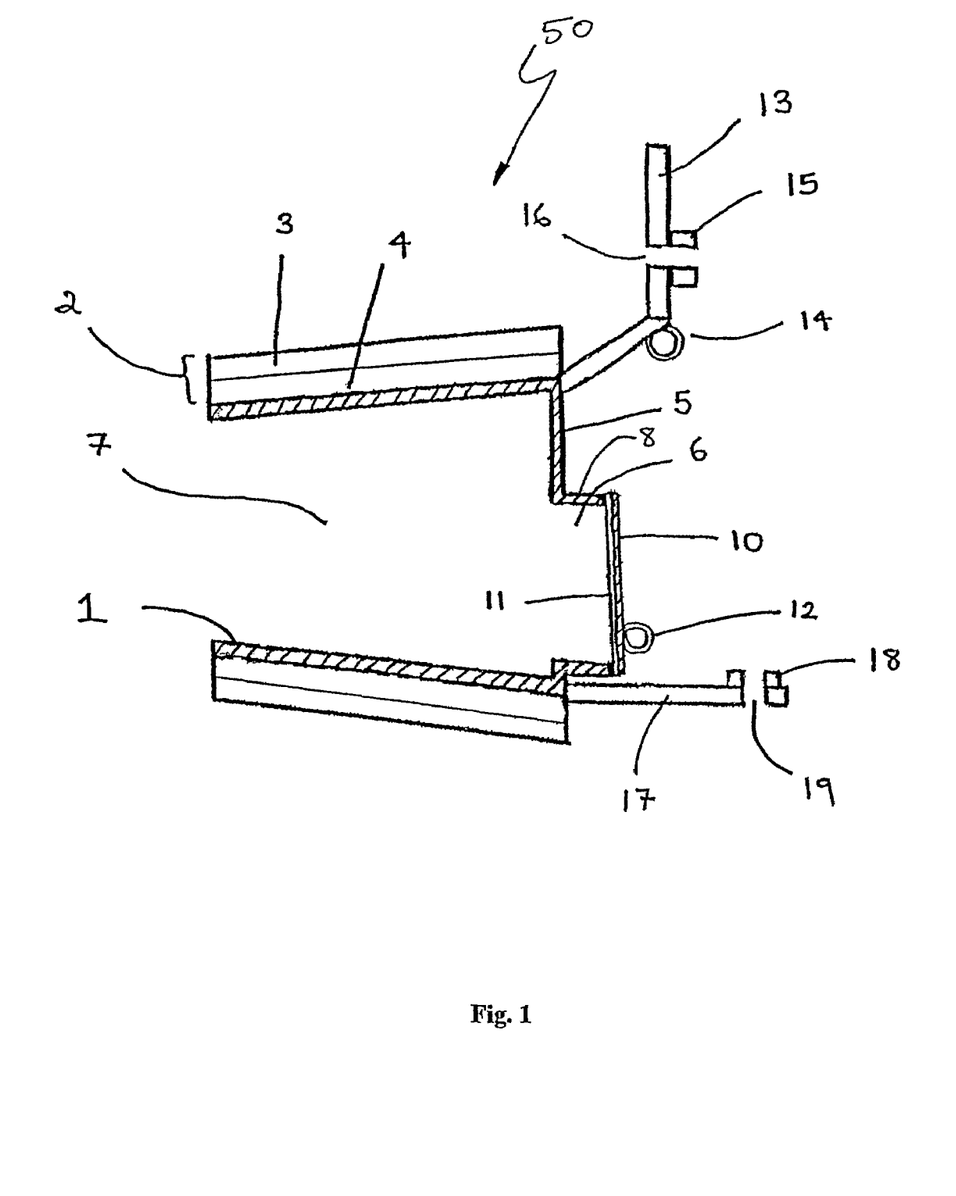
FIG. 1 shows a cross-sectional view of a first embodiment of the present invention.
Figure 2:
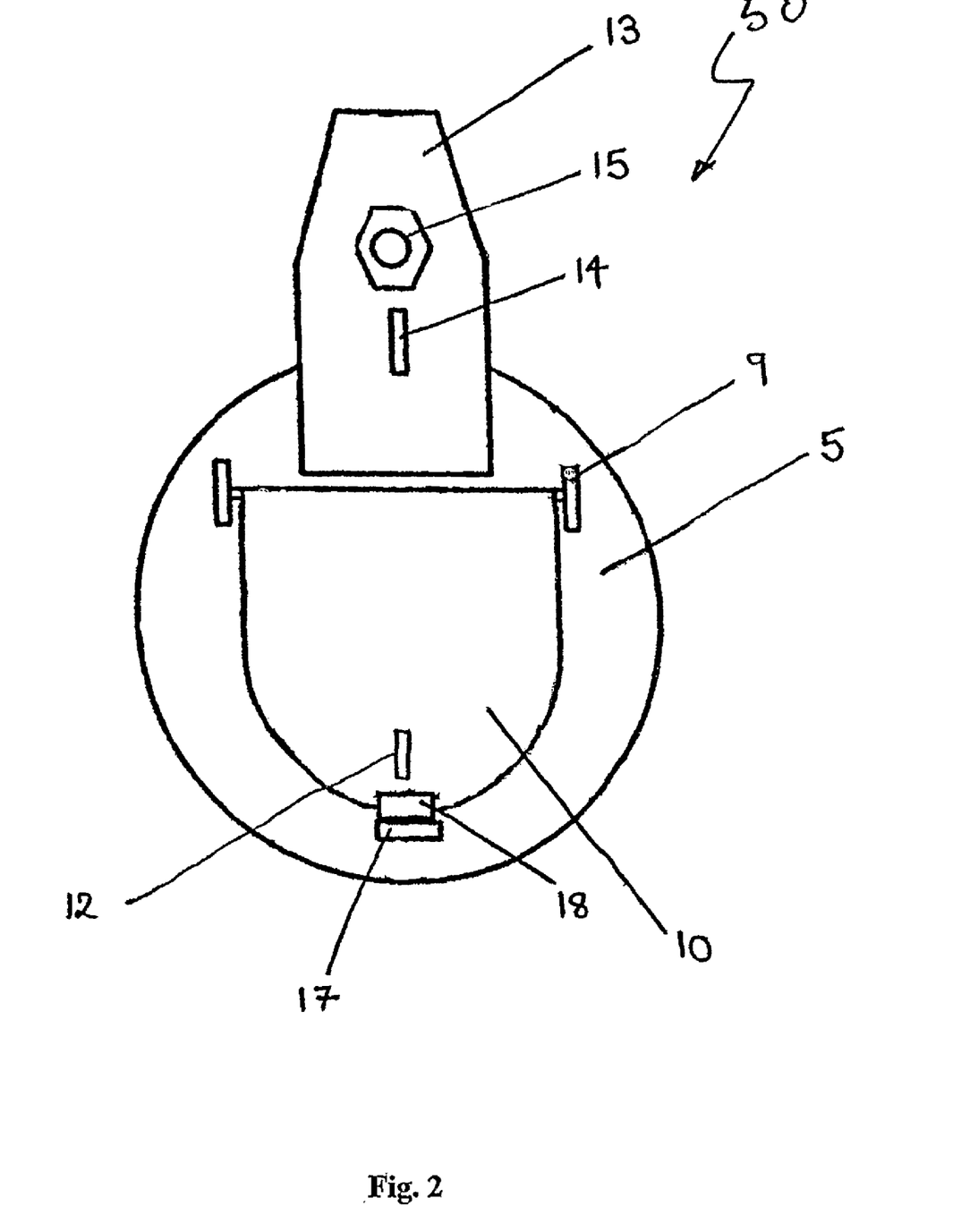
FIG. 2 shows an end view of the fist embodiment of the present invention.

FIGS. 1 and 2 show a cross sectional view and end view of a first embodiment of the present invention.

The plug 50 comprises a frusto-conical stainless steel body 1, having a base plate 5. The thickness of the body walls and base plate being substantially constant at around 3 mm.

The walls of the rigid body 1 we coated with a sleeve 2 made up of a deformable layer 4 and an abrasion resistant layer 3. The deformable layer 4 is formed of neoprene closed cell foam rubber having a thickness of about 12 mm. The neoprene foam rubber is bonded to the rigid body 1 using an adhesive. The abrasion resistant layer 3 of the sleeve 2 is formed of Linatex 800® having a thickness of about 6 mm. The abrasion resistant layer 3 protects the deformable layer 4 from abrasion by the interior surface of the gravity flow pipe. The abrasion resistant layer 3 is preferably bonded to the deformable layer 4 using adhesive.

The length of the plug 50, namely the length of the frusto-conical portion of the plug 50 can vary depending upon the application for which the plug 50 is to be used. Typically, the plug 50 has a length between 100-300 mm to provide sufficient surface contact against the interior walls of the gravity flow pipe in which it is to be used, to facilitate sealing. The maximum diameter of the abrasion resistant layer 3 may also vary and is largely dependent upon the diameter of the gravity flow pipe in which it is to be used.

The rigid body 1 is hollow, with the hollow interior forming a through channel 7 terminating in an aperture 6 formed in the base plate 5 of the rigid body 1. The aperture is defined by a flange 8 extending from the base plate 5.

Figure 5:
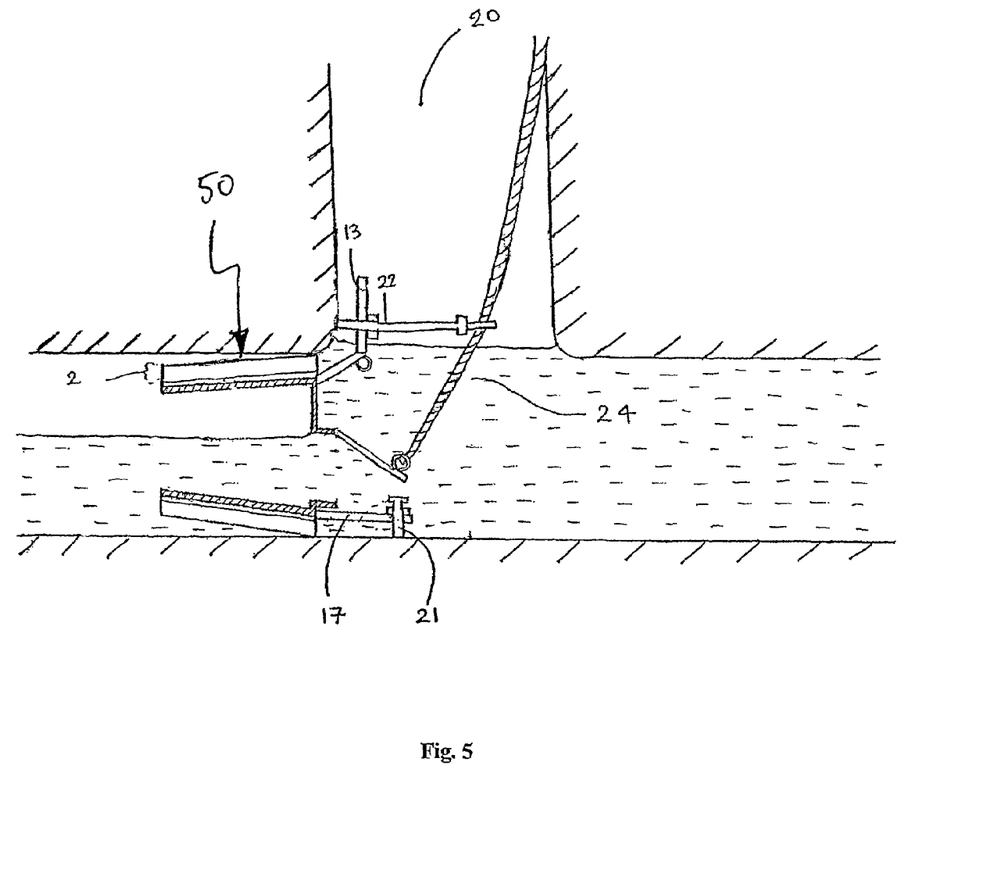
FIG. 5 shows the opening of the valve of the first embodiment of the present invention prior.

The rim of the flange 8 is sealed by a valve comprising a sealing plate 10 having a sealing layer 11 for ensuring a good seal of the plate 10 against the rim. The sealing layer 11 is formed of Linatex 800®. The sealing plate 10 and sealing layer 11 are connected to the base plate 5 by a hinge (not shown in FIG. 1). The hinged plate 10 is pivotable from a closed position as shown in FIG. 1 to an open position (as shown in FIG. 5) in which the sealing layer 11 loses contact with the rim of the flange 8 to expose the aperture 6 to enable fluid to flow through the plug 50.

The external surface of the sealing plate 10 is provided with an eyelet 12. The eyelet 12 allows for remote actuation of the valve. In this regard, a rope or rod may be attached to the eyelet 12 and activated from a remote position to lift the sealing plate 10 and sealing layer 11 away from the aperture 6. The sealing plate 10 is oriented to assist easy opening of the valve by a rope/rod extending up the access shaft to the entrance of the gravity flow system such that a mere pulling/pivoting action by an individual against the rope/rod is sufficient to open the valve. The eyelet 12 may also be used to assist in extraction of the plug 50 from the access shaft following maintenance or access to the gravity flow system. The eyelet 12 may also be used to maintain the valve in an open position as will be discussed in more detail below.

The plug 50 further comprises means for stabilising the plug 50 and preventing slippage of the plug 50 within the pipe of the gravity flow system. This is achieved by preventing inclination of the base plate 5 from the substantially vertical position by indirect abutment of the plug 50 with the wall/floor of the access shaft. In this regard, a lower supporting bracket 17 extends perpendicularly from the base plate 5 and has a through-hole 19 and a threaded nut 18.

Figure 3:
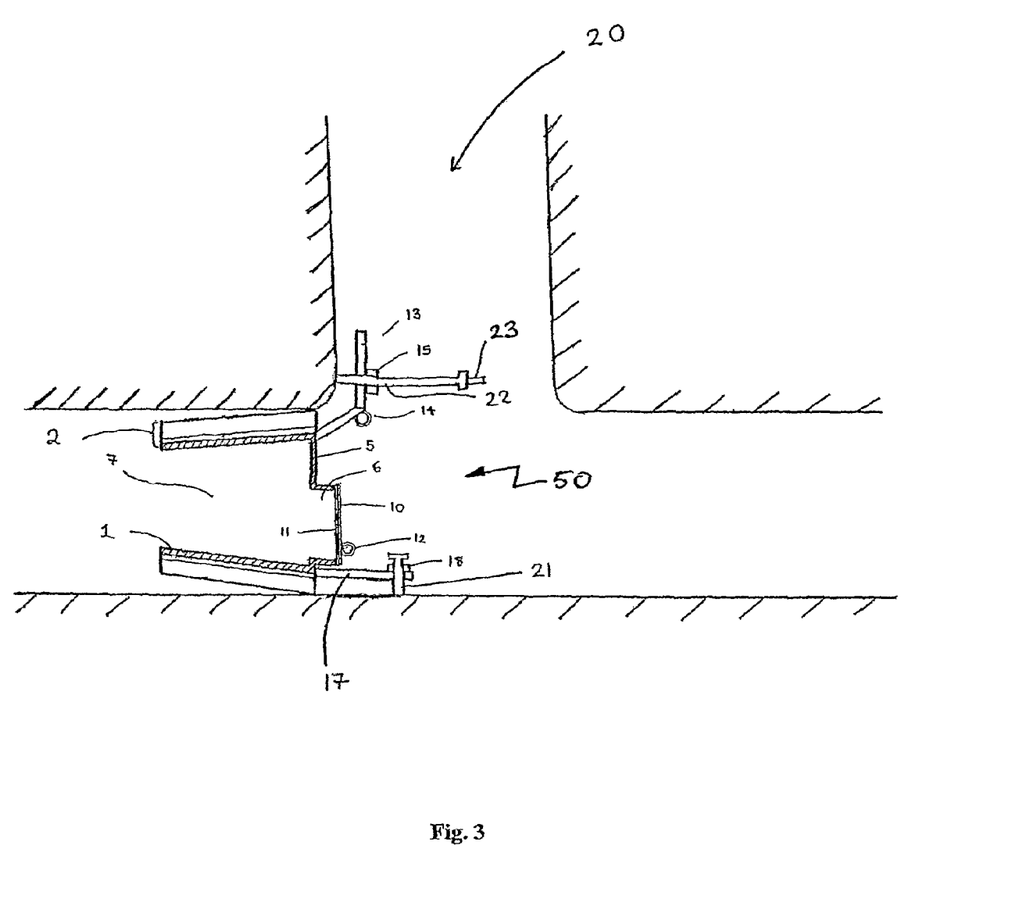
FIG. 3 shows the first embodiment of the present invention in position in a sewer pipe at the commencement of downstream work.

The plug 50 further comprises an upper support bracket 13 which is connected to the base plate 5 at an upper edge, when orientated in a wrong position (as shown in FIG. 3). The upper support bracket 13 extends from the base plate 5 and is orientated such that the upper portion of the bracket 13 extends up the access shaft substantially perpendicularly to the access shaft wall. The upper support bracket 13 includes a through-hole 16 and a threaded nut 15.

The upper support bracket 13 is also provided with means for assisting extraction of the plug from the gravity flow system, in the form of an eyelet 14. The eyelet 14 provides an anchor point to which a rod or rope can be attached to pull the plug 50 from the gravity flow system after use. The rope or rod may extend up the access shaft to an entry point of the gravity flow system such that the plug 50 can be remotely removed and retrieved from the gravity flow system without the need for a worker to physically enter the gravity flow system. The eyelet 14 can also be used as locking means to which the eyelet 12 can be locked using a bolt or karabiner to maintain the valve in an open position as alluded to above.

Figure 6:
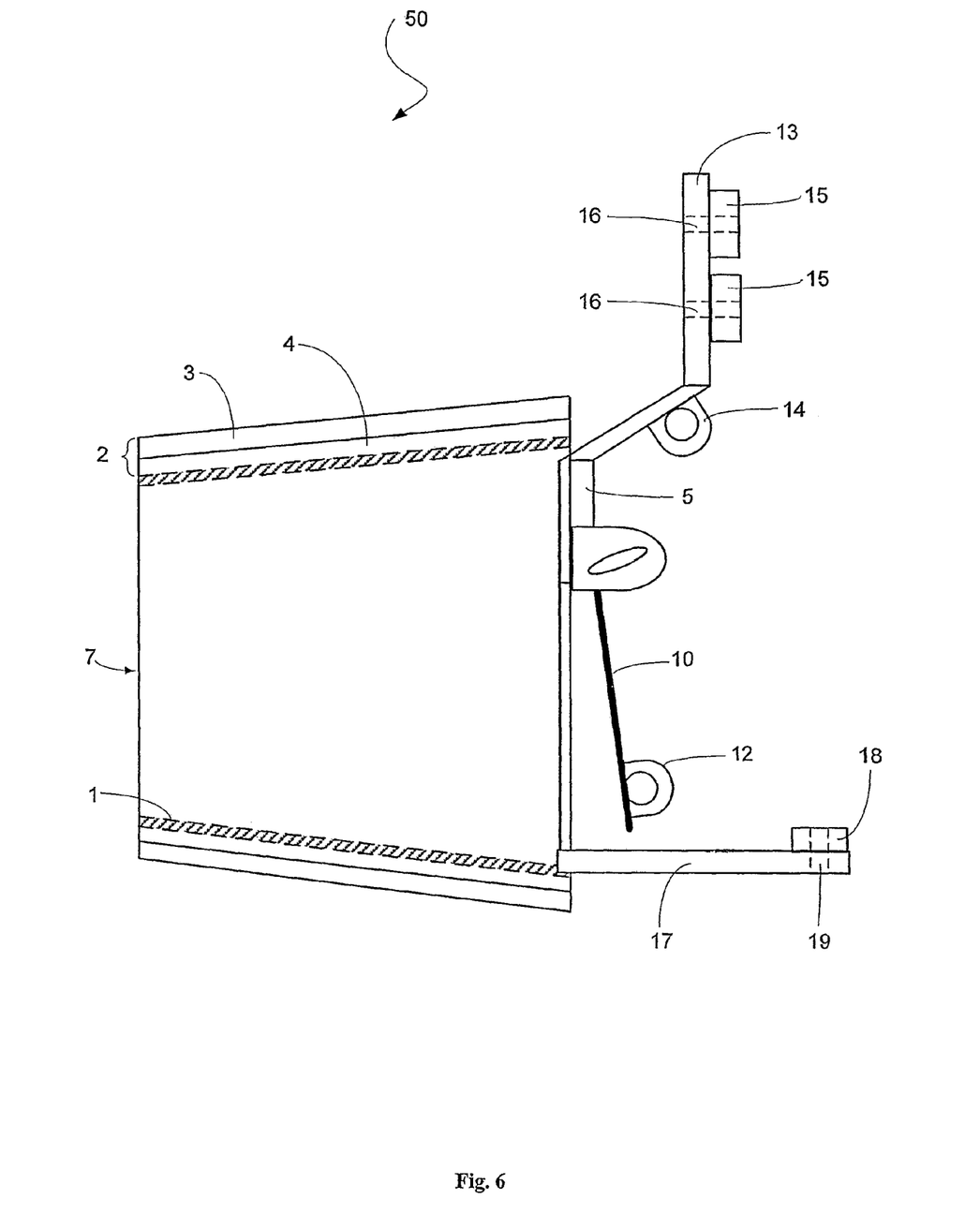
FIG. 6 shows a cross-sectional view of a second embodiment of the present invention.
Figure 7:
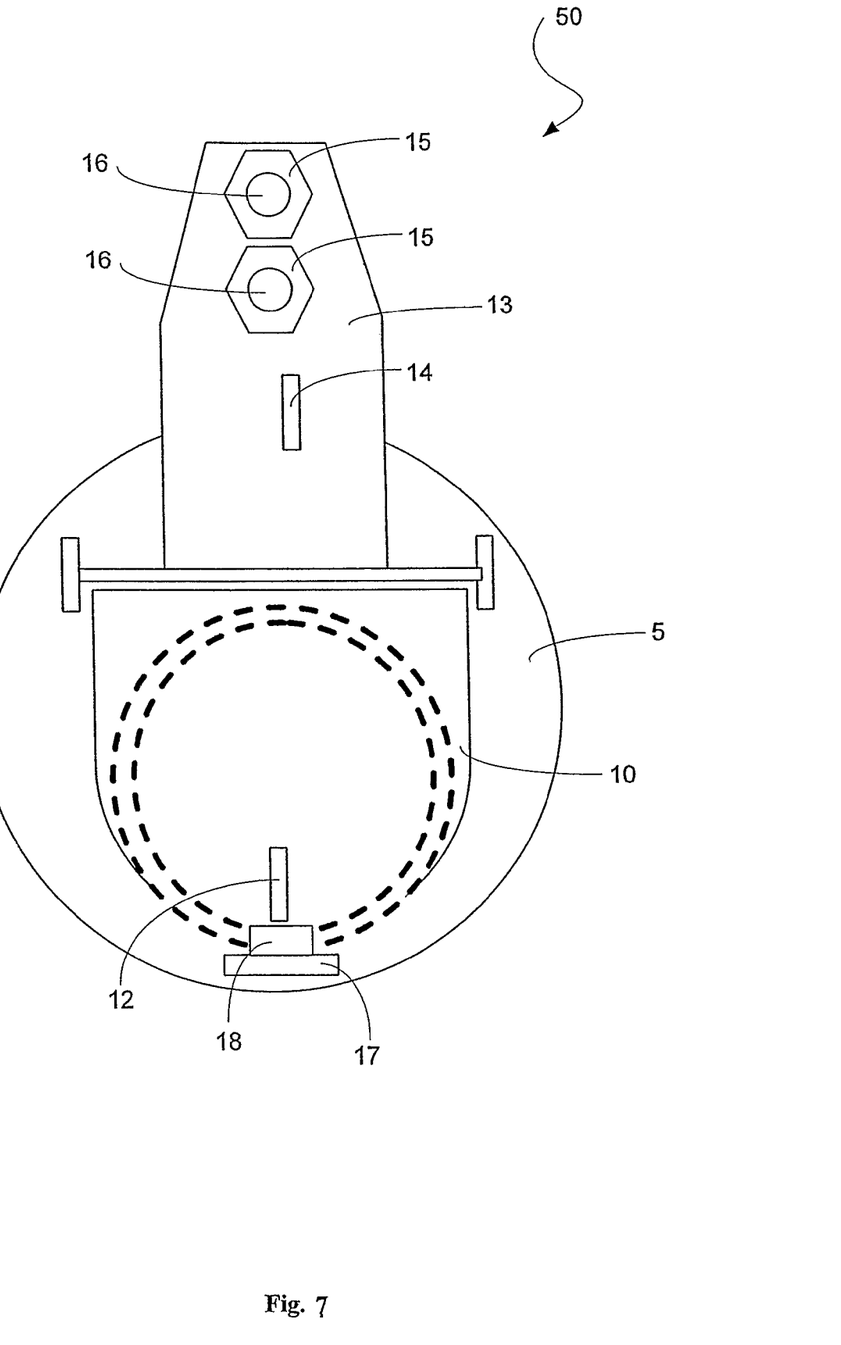
FIG. 7 shows an end view of the second embodiment of the present invention.

Referring to FIGS. 6 and 7, an alternative embodiment of the plug 50 is shown. In this embodiment, there is no flange 58 extending from the base plate and as such the sealing plate 10 is arranged to sit flush with the surface of the base plate 5 to seal the aperture 6 formed therein. Whilst not shown, it will be appreciated that surface of the sealing plate 10 which contacts the base plate 5 may also be provided with a sealing layer 11 to ensure an optimal seal against the base plate 5.

In the embodiment as shown in FIGS. 6 and 7, the upper support bracket 13 may be provided with more than one through-hole 16 and threaded nut 15 to provide a variety of positions for the upper abutment means, as will be discussed below, to provide for fitting of the plug 50 in a variety of applications and sized gravity flow systems.

FIG. 3 shows the plug 50 in an operating position within a gravity flow system. The gravity flow system is provided with access shaft 20 into which the plug 50 is manually lowered and pushed into the pipe such that the abutment surface of the sleeve 2 contacts the interior surface of the pipe.

An upper abutment means, in the form of an elongate threaded screw 22, is inserted through the through hole 16 and threaded nut provided in the upper support plate 13 such that the screw 22 abuts the sidewall of the access shaft. This prevents inclination of the base plate 5 from the vertical and thus prevents slipping of the top edge of the plug 50 against the interior surface of the pipe. The elongate threaded screw 22 also includes a guide means in the form of an eyelet 23, the purpose of which will be discussed in more detail below. As discussed in relation to the eyelets 12, 14 above, the eyelet 23 can also be used as means for assisting extraction of the plug from the interior of the gravity flow system following use.

A lower abutment means, in the form of second threaded screw 21, is inserted through the threaded nut 18 and the through-hole 19 provided in the lower support bracket 17 such that the threaded screw 21 abuts against the bottom surface of the access shaft. This lower abutment means also acts to stabilise the plug 50, by preventing inclination of the base plate 5 from the vertical and thus prevents slipping of the bottom edge of the plug 50 against the interior surface of the pipe.

As shown in FIG. 3, the plug 50 is typically positioned such that the valve is closed, with the sealing plate 10 sealing the aperture 6, which is defined by the rim of the flange 8 on the base plate 5.

Before or after insertion and positioning of the plug 50 within the pipe, a rope or rod 24 is attached to the eyelet 12 on the sealing plate 10. This rope 24 may also pass through the guide means (eyelet 23) on tho threaded screw 22, such that it is maintained at an angle of about 45 degrees to the sealing plate 10. The manner in which the rope 24 is attached to the plug 50 is shown in FIGS. 4 and 5.

Figure 4:
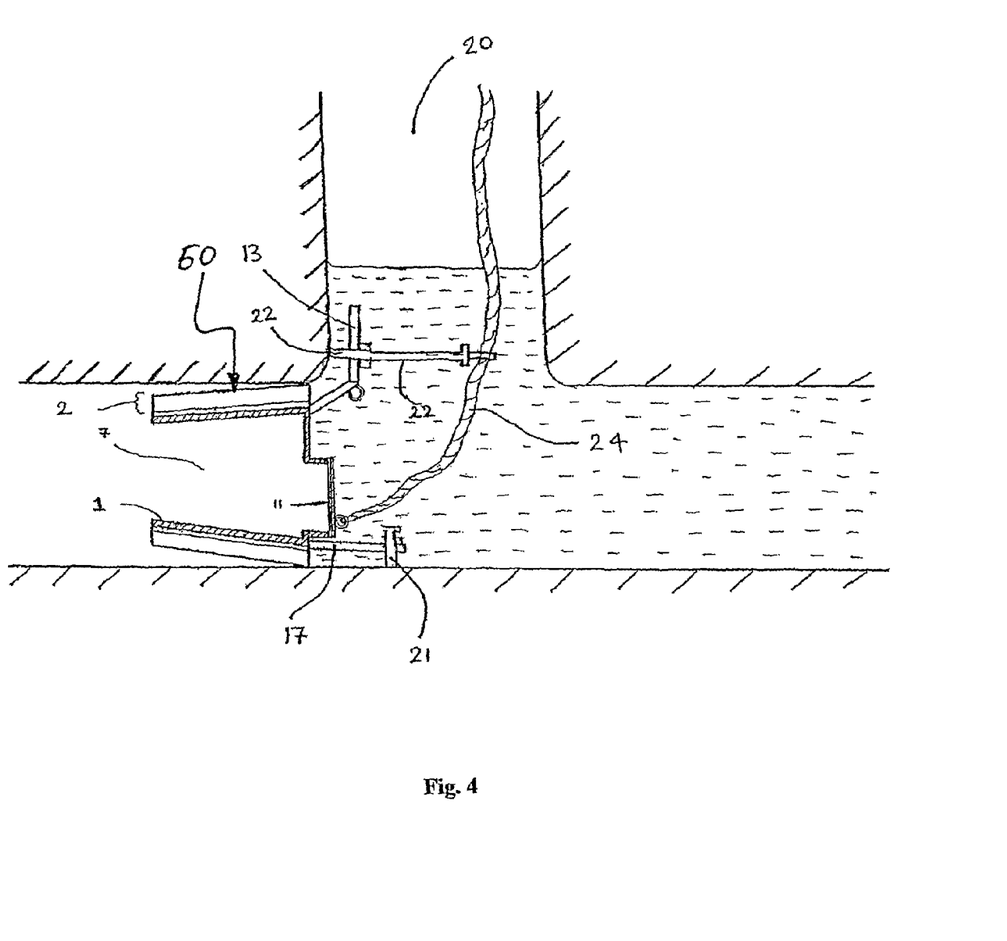
FIG. 4 shows the first embodiment of the present invention in position in a sewer pipe at the completion of downstream work.

FIG. 4 shows the plug 50 in use in a pipe to facilitate downstream work to be performed in the pipes of the gravity flow system. As can be san, when the plug 50 is positioned within the pipe, waste water builds up behind the plug 50. Depending upon the amount of water flowing through the gravity flow system, the pressure of the waste water behind the plug 50 could be sufficient to cause the plug 50 to slip within the pipe thereby enabling water to pass through the pipe, jeopardising any work being undertaken in the pipes downstream of the plug 50 and potentially endangering the safety of the workers performing such work. However, the presence of the lower and upper abutment moans in the form of the threaded screws 22, 21 abutting against the floor and wall of the access shaft respectively, stabilises the plug 50 to prevent slipping of the plug 50 and hence blocking the passage of water through the pipe.

When work downstream of the plug 50 is completed, it is necessary to remove the plug to allow normal flow of waste water to resume, thereby relieving the build-up of waste water behind the plug 50.

Due to the presence of the build-up of water pressure behind the plug 50, it is difficult to simply manually remove the plug 50 from the gravity flow system against such pressure. Therefore, in order to relieve the water pressure and thus facilitate removal of the plug 50, the valve is opened by the lifting of the sealing plate 10 and the sealing layer 11 away from the aperture 6, as shown in FIG. 5. This is effected remotely from outside of the access shaft using the rope 24 secured to the eyelet 12 on the hinged sealing plate 10. The angle at which the rope 24 is maintained by the eyelet 23 on the threaded screw 22 facilitates the raising of the sealing plate 10.

As the sealing plate 10 is caused to move away from the aperture 6, waste water can drain through the aperture 6 and the through-channel 7 of the plug 50 to restore the fluid flow through the pipe, so that the water pressure behind the plug 50 is significantly reduced. The valve can be maintained in the open position for the duration of the draining by the locking of the aligned eyelets (eyelet 12 on the sealing plate 10 and eyelet 14 on the upper support bracket 13) using a bolt or karabiner.

Once the build-up of waste water has been reduced, and in particular drained from the access shaft, it becomes possible to remove the plug 50. The plug 50 can be removed from the pipe manually, for example by manipulating the elongated threaded screw 22. Thereafter, the plug 50 can be raised from the access shaft using the rope 24 attached to the sealing plate eyelet 12. Alternatively, the rope 24 can be untied from the eyelet 12 and retied to one of the other eyelets, e.g. the eyelet 23 on the threaded screw 22, or the eyelet 14 on the upper support bracket 13, to provide a more rigid point at which the plug 50 can be pulled from the pipe.

Figure 8:
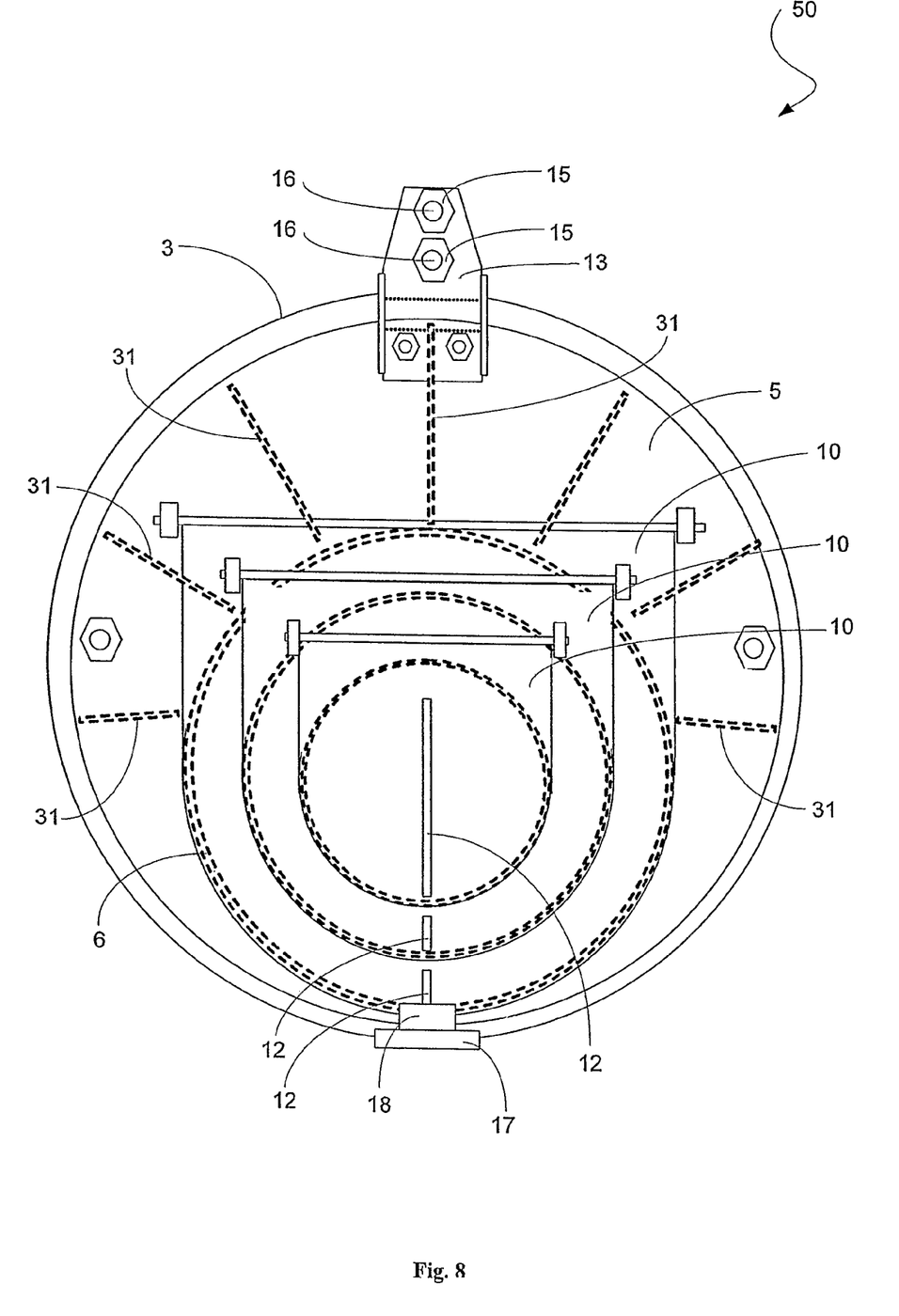
FIG. 8 shows an end view of a third embodiment of the present invention.
Figure 9:
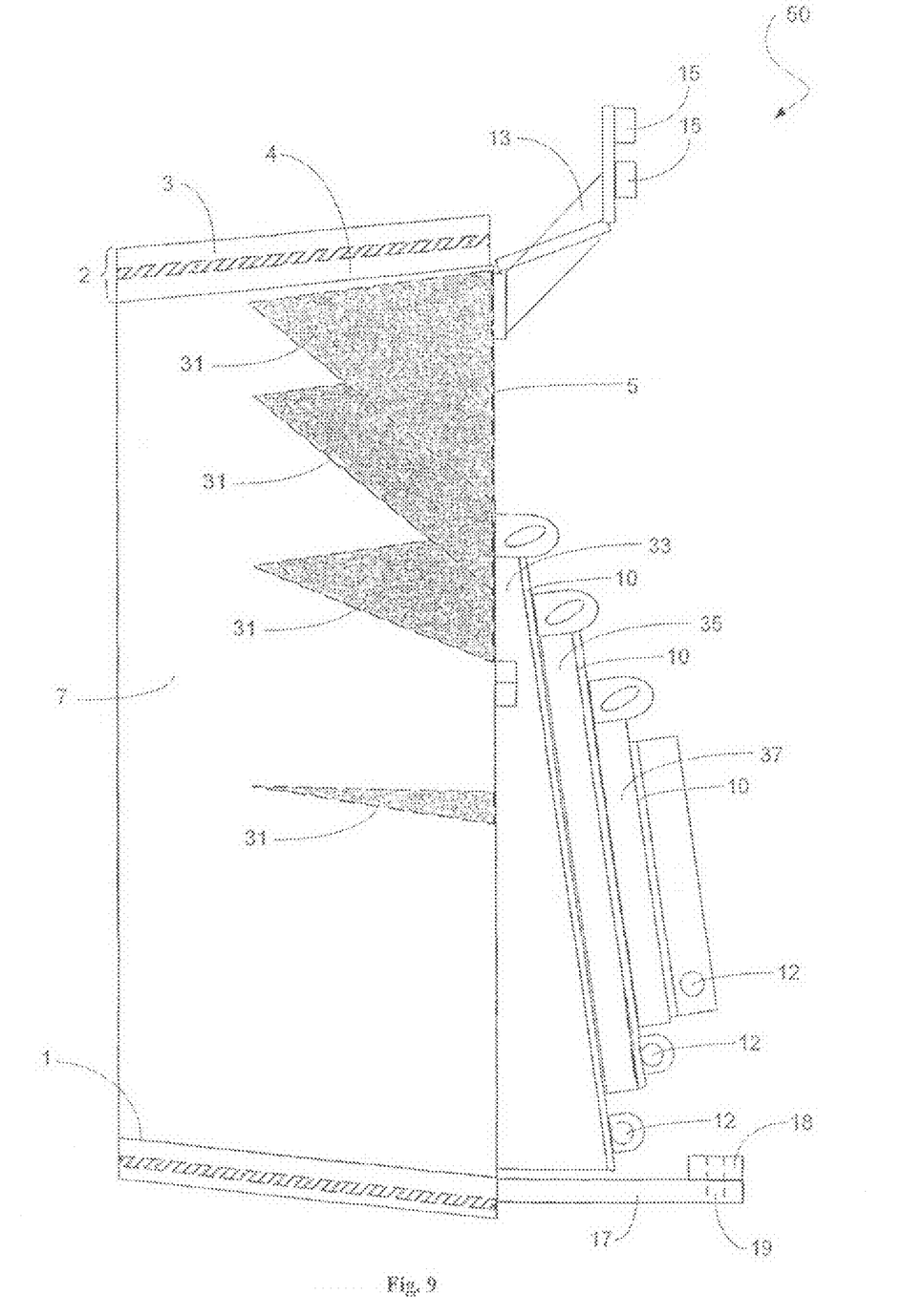
FIG. 9 shows a cross-sectional view of the third embodiment of the present.

FIGS. 8 and 9 show yet another embodiment of the plug 50 of the present invention. This plug 50 is typically of a larger size to be used with a larger sized gravity flow pipe. As such, the maximum diameter of the abrasion resistant layer 3 may be in the range of 800-900 mm, thereby presenting a greater surface area of the base plate 5 against the flow of water within the gravity flow pipe, which greatly increases the pressures experienced by the base plate 5 during use. Due to the larger pressures experienced by the base plate 5, a plurality of bracing members 31 are provided on the internal face of the base plate 5 extending from the rigid body 1 to the aperture 6 to provide strength and rigidity to the base plate 5 to withstand such pressure. The internal bracing members 31 may be welded to the internal face of the base plate 5 as shown, and the thickness of the base plate may be increased to further accommodate the increase in pressure.

As opposed to the plug 50 described in relation to FIGS. 1-7 above, the plug 50 of FIGS. 8 and 9 employs a multiple stage water pressure release system to remove the plug, due to the greater water pressures the plug is subjected to. As shown more clearly in FIG. 9, a plurality of piped sections 33, 35, 37 are arranged over the aperture 6 formed in the base plate 5 to enable gradual release of the built-up water through the plug 50. The piped sections 33, 35, 37 provide a variety of sized of flow paths through which the water can flow through the plug 50, with the smallest path being through the most distal piped section 37.

Each of the piped sections 33 are provided with a hinged sealing plate 10, in the manner as previously described, which can be remotely actuated by way of a rope/rod received through the eyelets 12, to open the flow path associated with the piped section. In this arrangement, upon an intention to remove the plug 50 from the gravity flow system following maintenance of the pipes associated therewith, the hinged sealing plate 10 associated with piped section 37 may be firstly opened to allow the built-up water behind the plug to flow through the piped section 37. Following a release of an amount of built-up water through the piped section 37, thereby reducing the pressure being exerted by the built-up water against the base plate 5 of the plug 50, the hinged sealing plates 10 associated with the piped sections 35 and 33 way then be actuated to open the piped sections 35 and 33 respectively to increase the flow volume of the water passing through the plug 50 to further relieve the built-up pressure behind the plug. Upon relieving the build-up of pressure, the plug 50 can be removed from pipe, as discussed above.

Whilst each of the above embodiments have been described in relation to a remotely accessible hinged valve to facilitate water pressure release in the gravity flow system, it will be appreciated that other types of valves, such as butterfly valves or sliding valves, could also be employed.

It will be appreciated that the plug 50 according to the invention has numerous advantages over the known expandable plugs. Firstly, it is more easily manufactured. Secondly, it does not rely on pneumatic pressure to seal the pipe and thus does not require the provision of a pneumatic pump nor means for monitoring pressure. Furthermore, it cannot burst and thus is considerably safer for downstream workers than the known expandable plugs. In view of the fact that it cannot burst it does not require an exclusion zone and thus is not so restricted in use. Finally, it is easy to use; it is simply lowered into an access shaft of a gravity flow system and forced into the downstream pipe, with the optional use of lubricant.

It will be further appreciated by persons skilled in the art that numerous variations and/or modifications may be made to the invention as shown in the specific embodiments without departing from the scope of the invention as broadly described. The present embodiments are, therefore, to be considered in all respect as illustrative and not restrictive.

The invention claimed is:

1. A plug which is frusto-conical in shape and which comprises a rigid body having a base plate, the rigid body being at least partially encased in a sleeve, the sleeve being deformable and having an abutment surface for abutment against the interior surface of a gravity flow system pipe, wherein the plug includes a through channel terminating at one end at an aperture on the base plate, the aperture being selectively openable and closable using a valve, and wherein the plug includes means for assisting extraction of the plug from the interior of the gravity flow system.

2. The plug according to claim 1 wherein said sleeve comprises at least one deformable layer formed of an elastically deformable polymer.

3. The plug according to claim 1 wherein the sleeve comprises an abrasion resistant layer, the abrasion resistant layer being outermost to form the abutment surface.

4. The plug according to claim 1 wherein the valve comprises a sealing plate connected to the base plate at a hinge.

5. The plug according to claim 1 wherein the valve is provided with means to allow actuation of the valve from outside the gravity flow system.

6. The plug according to claim 1 further comprising means to prevent slipping of the plug within the pipe by prevention of the inclination of the base plate from the vertical when positioned in a gravity flow system pipe.

7. The plug according to claim 6 wherein said means to prevent slipping act by abutment either directly or indirectly with the floor and/or wall of an access shaft of the gravity flow system.

8. A method of sealing a gravity flow system pipe by inserting into said pipe a plug according to claim 1, such that, upon insertion, the sleeve is deformed and the abutment surface forms a sealing engagement with the interior surface of the gravity flow system pipe.

9. A device for preventing fluid flowing through a pipe, said device comprising:
   a rigid body that is frusto-conical in shape and which is at least partially insertable into said pipe, the rigid body being at least partially encased in a sleeve, the sleeve being deformable and an abutment surface for abutment with an inner surface of the pipe; and
   at least one valve element arranged within said body, said at least one valve element being selectively openable and closable to substantially prevent fluid flowing through said body and to permit said fluid to flow through said body to facilitate removal of said body from said pipe.

10. The device according to claim 9, wherein the sleeve comprises at least one deformable layer formed of an elastically deformable polymer.

11. The device according to claim 9 wherein the sleeve comprises an abrasion resistant layer, the abrasion resistant layer being outermost to form the external surface.

12. The device according to claim 9, wherein the body includes a through channel terminating at one end at one or more apertures formed on a base plate, each aperture being selectively open able and closable using said valve element.

13. The device according to claim 12, wherein the valve element comprises a sealing plate connected to the base plate at a hinge.

14. The device according to claim 9 wherein the valve element is provided with means to allow remote actuation of the valve from outside the gravity flow system.

15. The device according to claim 9, wherein the valve element is a butterfly valve or sliding valve.

* * * * *